United States Patent
Soss (10) Patent No.: US 7,337,085 B2
(45) Date of Patent: Feb. 26, 2008

(54) SENSOR BASELINE COMPENSATION IN A FORCE-BASED TOUCH DEVICE

(75) Inventor: David A. Soss, Salt Lake City, UT (US)

(73) Assignee: QSI Corporation, Salt Lake City, UT (US)

( * ) Notice: Subject to any disclaimer, the term of this patent is extended or adjusted under 35 U.S.C. 154(b) by 0 days.

(21) Appl. No.: 11/402,692

(22) Filed: Apr. 11, 2006

(65) Prior Publication Data

US 2006/0293864 A1    Dec. 28, 2006

Related U.S. Application Data

(60) Provisional application No. 60/708,867, filed on Aug. 16, 2005, provisional application No. 60/689,731, filed on Jun. 10, 2005.

(51) Int. Cl.
 *G01C 19/00* (2006.01)
(52) U.S. Cl. .................................................. 702/104
(58) Field of Classification Search ................. 702/104
 See application file for complete search history.

(56) References Cited

U.S. PATENT DOCUMENTS

| | | | |
|---|---|---|---|
| 3,090,226 A | 5/1963 | Cortie et al. | |
| 3,512,595 A | 5/1970 | Laiming | |
| 3,657,475 A | 4/1972 | Peronneau et al. | |
| 3,988,934 A | 11/1976 | Kamphoefner et al. | |
| 4,094,192 A | 6/1978 | Watson et al. | |
| 4,121,049 A | 10/1978 | Roeber | |
| 4,340,777 A | 7/1982 | DeCosta et al. | |
| 4,355,202 A | 10/1982 | DeCosta et al. | |
| 4,389,711 A | 6/1983 | Hotta et al. | |
| 4,398,711 A | 8/1983 | Horst et al. | |
| 4,511,760 A | 4/1985 | Garwin et al. | |
| 4,550,384 A | 10/1985 | Kimura | |
| 4,558,757 A | 12/1985 | Mori et al. | |
| 4,675,569 A | 6/1987 | Bowman et al. | |
| 4,726,436 A | 2/1988 | Fukuyama et al. | |
| 4,745,565 A | 5/1988 | Garwin et al. | |
| 4,918,262 A * | 4/1990 | Flowers et al. | ............. 345/173 |
| 5,022,475 A | 6/1991 | Sato et al. | |
| 5,038,142 A | 8/1991 | Flower et al. | |
| 5,053,757 A | 10/1991 | Meadows | |
| 5,241,139 A | 8/1993 | Gungl et al. | |
| 5,241,308 A | 8/1993 | Young | |
| 5,327,164 A | 7/1994 | Fagard et al. | |
| 5,376,948 A | 12/1994 | Roberts | |
| 5,447,074 A | 9/1995 | Polaert et al. | |
| 5,510,813 A | 4/1996 | Makinwa et al. | |
| 5,541,372 A | 7/1996 | Baller et al. | |

(Continued)

*Primary Examiner*—John Barlow
*Assistant Examiner*—Lisa Sievers
(74) *Attorney, Agent, or Firm*—Thorpe North & Western LLP (57) ABSTRACT

Disclosed is method and device for compensating a force sensor signal for baseline error in a force-based touch screen. In one embodiment, baseline compensation includes determining a decaying maximum value and a decaying minimum value of the force sensor signal, and subtracting these values to obtain a range value. When the range value is less than a predetermined activity threshold, updating of the baseline is disabled. The decaying maximum value and decaying minimum value are reset to the current value of the force sensor signal when exceeded by the current value of the force sensor signal.

11 Claims, 5 Drawing Sheets

U.S. PATENT DOCUMENTS

| | | |
|---|---|---|
| 5,673,066 A | 9/1997 | Toda et al. |
| 5,708,460 A | 1/1998 | Young et al. |
| 5,714,694 A | 2/1998 | Diessner |
| 5,854,625 A | 12/1998 | Frisch et al. |
| 5,917,906 A | 6/1999 | Thornton |
| 5,940,065 A | 8/1999 | Babb et al. |
| 6,285,358 B1 | 9/2001 | Roberts |
| 6,323,846 B1 | 11/2001 | Westerman et al. |
| 6,715,359 B2 | 4/2004 | Lokhorst et al. |
| 7,154,483 B2 | 12/2006 | Kobayashi |
| 7,158,122 B2 | 1/2007 | Roberts |
| 7,176,897 B2 | 2/2007 | Roberts |
| 7,183,948 B2 | 2/2007 | Roberts |
| 7,190,350 B2 | 3/2007 | Roberts |
| 7,196,694 B2 | 3/2007 | Roberts |
| 2002/0050984 A1 | 5/2002 | Roberts |
| 2002/0149571 A1 | 10/2002 | Roberts |
| 2002/0163509 A1 | 11/2002 | Roberts |
| 2002/0175386 A1 | 11/2002 | Kim et al. |
| 2002/0180710 A1 | 12/2002 | Roberts |
| 2003/0206162 A1 | 11/2003 | Roberts |
| 2003/0210235 A1 | 11/2003 | Roberts |
| 2003/0214485 A1 | 11/2003 | Roberts |
| 2003/0214486 A1 | 11/2003 | Roberts |
| 2004/0100448 A1 | 5/2004 | Moshrefzadeh |
| 2004/0125086 A1 | 7/2004 | Hagermoser et al. |
| 2004/0156168 A1 | 8/2004 | LeVasseur et al. |
| 2004/0156468 A1 | 8/2004 | Hamada et al. |
| 2004/0178997 A1 | 9/2004 | Gillespie et al. |
| 2004/0212583 A1 | 10/2004 | Cobian |
| 2006/0071912 A1* | 4/2006 | Hill et al. .................. 345/173 |
| 2006/0279548 A1 | 12/2006 | Geaghan |
| 2007/0052690 A1 | 3/2007 | Roberts |

* cited by examiner

SENSOR BASELINE COMPENSATION IN A FORCE-BASED TOUCH DEVICE

CROSS REFERENCE TO RELATED APPLICATIONS

This application claims the benefit of U.S. Provisional Patent Application Ser. No. 60/708,867 filed Aug. 16, 2005, entitled "Force-Based Input Device" and U.S. Provisional Patent Application Ser. No. 60/689,731 filed Jun. 10, 2005, entitled "Signal Conditioning in a Force-Based Touch Device," each of which is hereby incorporated by reference in their entirety for all purposes.

FIELD OF THE INVENTION

The present invention relates generally to force-based input devices, and more particularly to sensor baseline compensation in force-based input devices, wherein signals from force sensors in the force-based input device are processed to obtain specific characteristics about or related to an applied force, such as its location and magnitude.

BACKGROUND OF THE INVENTION AND RELATED ART

Input devices (e.g., a touch screen or touch pad) are designed to detect the application of an object and to determine one or more specific characteristics of or relating to the object as relating to the input device, such as the location of the object as acting on the input device, the magnitude of force applied by the object to the input device, etc. Examples of some of the different applications in which input devices may be found include computer display devices, kiosks, games, automatic teller machines, point of sale terminals, vending machines, medical devices, keypads, keyboards, and others.

Force-based input devices are configured to measure the location and magnitude of the forces applied to and transmitted by the input pad. Force-based input devices comprise one or more force sensors that are configured to measure the applied force, either directly or indirectly. Various types of force sensors can be used, including for example piezoresistive sensors and piezoelectric transducers. The force sensors can be operated with gloved fingers, bare fingers, styli, pens, pencils or any object that can apply a force to the input pad. Typically, location and magnitude of the applied force is determined by solving mechanical moment equations for which the inputs are the forces measured by the force sensors.

Determining the location and magnitude of the applied force is complicated by errors in the output from the force sensors. In particular, force sensors tend to have a baseline output even when not being touched. Baseline error is drift in the quiescent output of the sensors, for example due to environmental effects. For example, stresses on the force sensors due to the weight of the touch surface and/or preload forces that are applied during manufacture can result in non-zero output from the force sensors. Moreover, baseline output tends drift with time due to aging, temperature, and other factors. In particular, the determination of touch location can be extremely sensitive to baseline errors. This is because baseline errors can result in a constant bias in the formulas used to calculate the touch location. For example, baseline errors which appear in denominator terms tend to cause error in scale that varies with the applied force.

It is therefore helpful to determine the baseline output of a force sensor so that this error source can be compensated. Various ways are known for determining the baseline of a force sensor. In general, baseline determination is performed during periods of no touch activity. For example, baseline determination can include averaging the sensor output during periods of no touch activity. Distinguishing between periods of touch activity and no-touch activity can, however, be difficult. For example, light touches are difficult to distinguish from baseline variations. Additionally, piezoelectric sensors exhibit a dynamic baseline shift that is a function of the applied stimulus. Thus, touching the panel causes the baseline to change, usually in a predictable manner.

SUMMARY OF THE INVENTION

In light of the problems and deficiencies inherent in the prior art, the present invention seeks to overcome these by providing compensation for a force-based input device that can enhance the accuracy in determining the location and magnitude of an applied force.

In accordance with the invention as embodied and broadly described herein, the present invention features a method for determining a force sensor signal baseline in a force-based input device. The method includes accepting a signal associated with touch activity and determining a signal range, wherein the signal range decays with time and is reset when the signal exceeds the current range. A touch event is declared when the signal range exceeds a predetermined activity threshold. A previously determined baseline is held when a touch event is declared, and updated when a touch event is not declared.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention, they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

DETAILED DESCRIPTION OF EXEMPLARY EMBODIMENTS

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

Generally, the present invention describes compensating a force sensor signal for baseline error. The force-based input device includes a plurality of force sensors outputting a plurality of force sensor signals. The force sensor signals provide measurements of force transmitted to each force sensor by a touch or other applied force to the force-based input device. As noted above, the force can be applied by a variety of objects, including for example, a stylus or finger. For example, one force-based input device suitable for use with embodiments of the present invention is disclosed in commonly owned co-pending U.S. patent application Ser. No. 11/402,694, filed Apr. 11, 2006, and entitled "Force-Based Input Device," which is herein incorporated by reference for all purposes.

Typically, force sensor signals are provided by the force-based input device as analog signals. Analog signals may be processed in various ways, including for example using discrete components and analog integrated circuits. The force sensor signals may also be sampled and digitized, for example, using an analog-to-digital converter to provide digital, time-sampled data. For example, force sensor signals can be sampled at a rate between 25 and 200 samples per second, although other rates may prove advantageous as well. It is desirable, but not essential, that the sample rate be relatively high compared to the dynamics of the touch. Digitization can be performed with 16-bit resolution, although other resolutions may prove advantageous as well. Digital, time-sampled data may be processed in various ways, including for example, using a microprocessor, microcontroller, discrete logic, application specific integration circuit, or field programmable gate array. Specific characteristics about or related to an applied force, such as its location and magnitude, can be determined using various techniques, including for example those disclosed in commonly owned U.S. patent application Ser. No. 11/402,985, filed Apr. 11, 2006, and entitled "Sensor Signal Conditioning in a Force-Based Input Device," which is herein incorporated by reference for all purposes. Various suitable detailed implementations of the methods and apparatuses disclosed herein will occur to one skilled in the art in possession of this disclosure.

Figure 1:
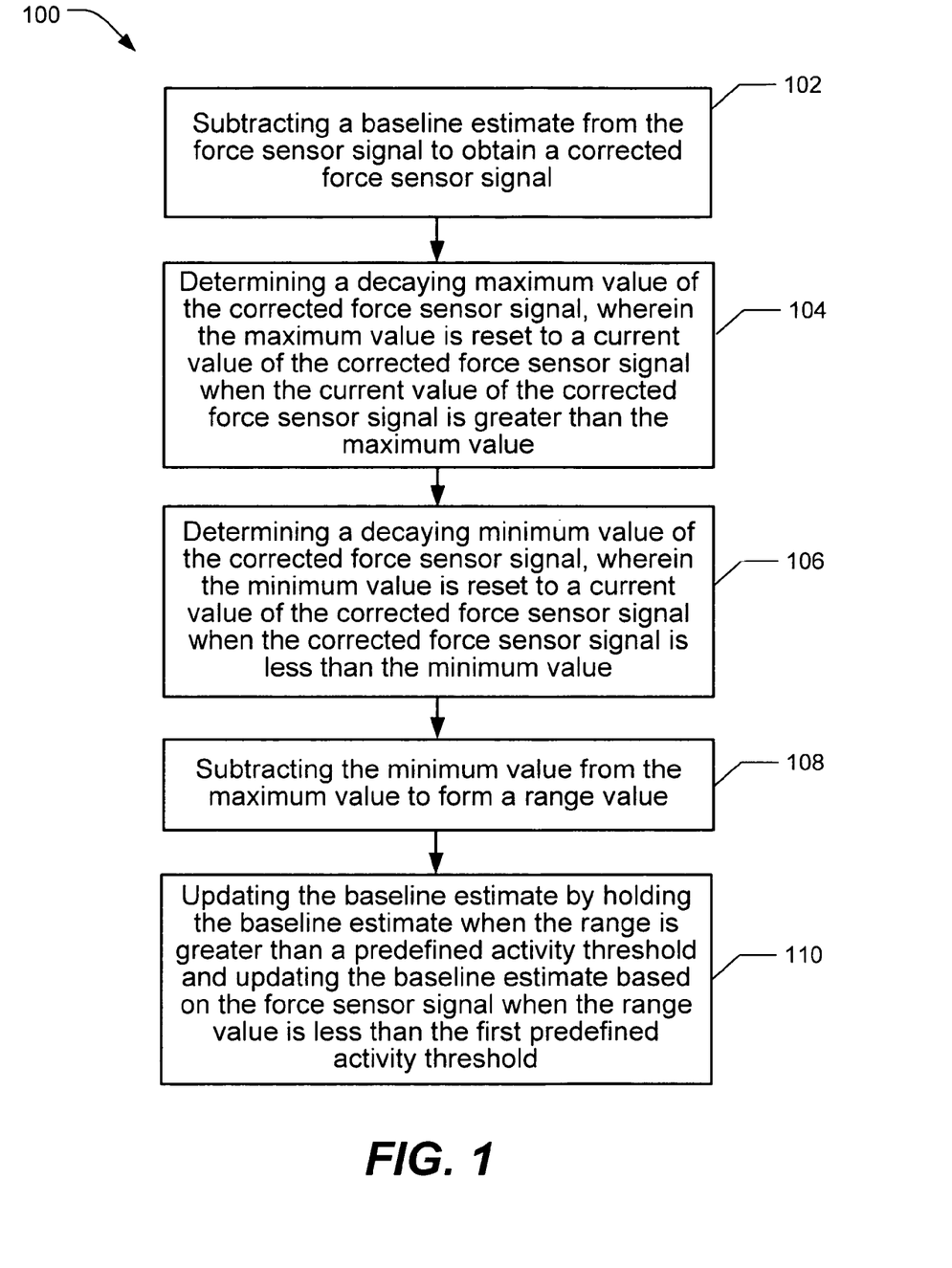
FIG. 1 illustrates a flow chart of a method for compensating a force sensor signal for baseline error in accordance with an embodiment of the present invention.

As illustrated in FIG. 1, a flowchart of a method of compensating a force sensor signal for baseline error is illustrated in accordance with an exemplary embodiment of the present invention. The method, shown generally at 100, includes subtracting 102 a baseline estimate from the force sensor signal to obtain a corrected force sensor signal. The baseline estimate is preferably only updated when there is no touch event, and this is accomplished by determining a decaying maximum value 104 and determining a decaying minimum value 106 of the corrected force sensor signal. The decaying maximum value is reset to the current value of the corrected force sensor signal when the corrected force sensor signal exceeds the current maximum value. Similarly, the decaying minimum value is reset when the corrected force sensor signal is less than the current minimum value. For example, the decaying minimum and maximum value may both decay exponentially towards zero. Thus, the decaying minimum and maximum value will track the positive and negative peaks of the force sensor signal, slowly decaying back to the mean value of the force sensor signal. A range is formed by subtracting 108 the minimum value from the maximum value. The range value thus provides an indication of the recent history of the force sensor signal. A large range, e.g. a range greater than a predefined activity threshold, is generally indicative of a touch event. Hence, the method can include updating 110 the baseline estimate when the range is less than the predefined activity threshold and holding the baseline estimate when the range is greater than the predefined activity threshold. The predefined activity threshold may be set to be relatively sensitive to activity so as to maintain a low probability that the baseline is updated during a touch event.

The use of the range value to determine touch activity helps to overcome problems that can occur when a fixed threshold is used to determine touch activity. For example, if an absolute level of force is used to determine touch activity, the detection threshold is subject to errors in the baseline. A baseline error higher than the detection threshold can thus result in baseline updates never being enabled. Because the range value is constantly being updated, the method 100 helps to prevent this situation from occurring. More particularly, the baseline update can be enabled or disabled based on the variability of the force sensor inputs as estimated by the range (that is, the maximum value minus the minimum value or peak-peak value) over a fixed time (fixed number of samples). If the range of each of the force sensors is separately less than a preset threshold, the force estimation can be enabled. Since the peak-to-peak range does not depend on the baseline, the baseline estimation will eventually be enabled even though the current baseline is not correct. The baseline estimation will remain disabled for the duration of a touch, and some time afterward, because it is difficult for a person to maintain a constant applied force for sufficient time for the range estimate to decay below the preset threshold It will be appreciated that, for force-based input devices which can detect force applied to either side, the force sensor signals can be either positive or negative. Piezoelectric or other dynamic force sensors also provide both positive and negative pulses, one at the beginning of a touch and one at the end of the touch, each pulse being of opposite polarity. Because the range is determined by comparing the decaying maximum and the decaying minimum value, the method 100 can handle both of these situations.

Optionally, the method 100 can include disabling baseline updates during periods of time during which one or more force sensors are in saturation or non-linear behavior. For example, when a force sensor is in saturation, the range may go to zero, at which point detection of a touch event becomes difficult.

Optionally, the method 100 may also include determining a first time interval since the last reset of the maximum value and setting the maximum value to the current value of the force sensor signal when the time interval is greater than a first time limit. Similarly, the method may include determining a second time interval since the last reset of the minimum value, and resetting the minimum value when the second time interval is greater than a second time limit. The just described reset features may be implemented for either the maximum value alone or the minimum value alone, or for both the maximum value and minimum value. The first and second time intervals can be determined by counting samples in a time sampled system. The reset features can help to prevent the updating from being disabled for too long a time period (for example due to a noise spike or error setting the minimum or maximum to a large extreme).

For example, the following pseudo code illustrates an algorithm for the determination of a decaying maximum value in a time sampled system, in accordance with an embodiment of the present invention:

```
SET K_p = 1
SET P to the current value of the force sensor signal
REPEAT for each sample time
    SET S to the current value of the force sensor signal
    IF (S > P) or (K_p > first time limit) THEN
        SET P = S
        SET K_p = 1
    ELSE
        SET P = δ S + (1 − δ) P
        SET K_p = K_p + 1
    END-IF
END-REPEAT
```

The variable S holds the current value of the force sensor signal. The variable P holds the the decaying maximum value. The variable $K_p$ counts the number of samples since the last time the decaying maximum value P was reset to the current value S of the force sensor signal. The value δ is a constant 0<δ<1. Determination of a decaying minimum value will be readily apparent from the above. Various other implementations will occur to one skilled in the art.

Figure 2:
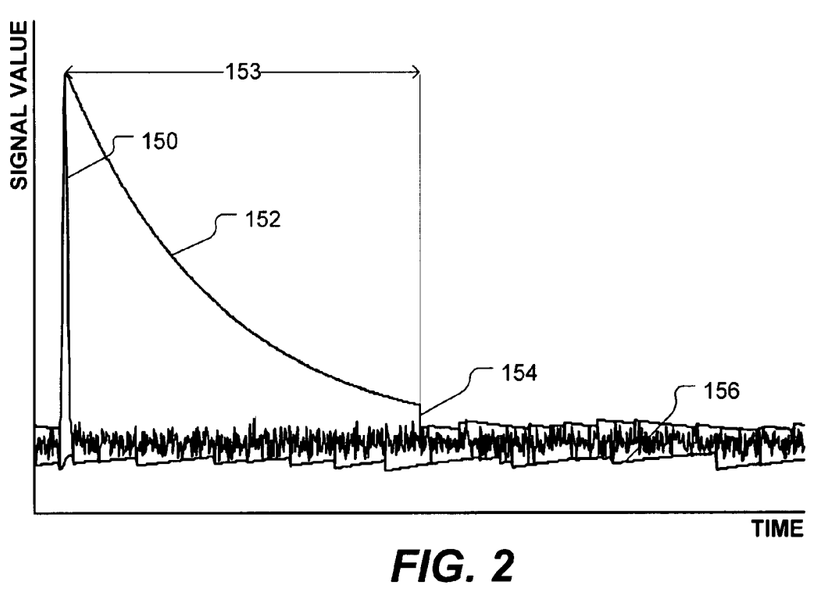
FIGS. 2 and 3 illustrate plots of signal values during operation of the method using a simulated force sensor signal in accordance with an embodiment of the present invention.
Figure 3:
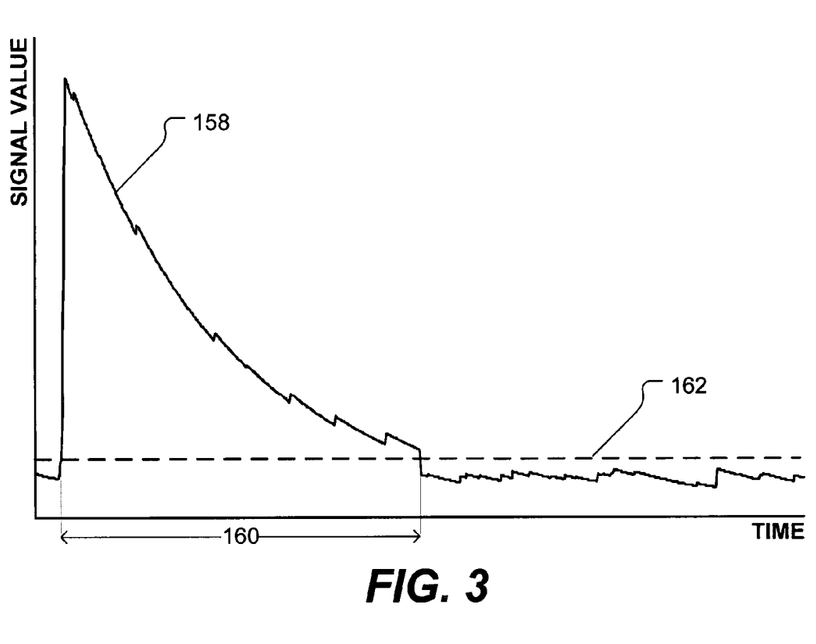

FIGS. 2 and 3 provide signal plots illustrating various values during operation of the method 100 as applied to a simulated force sensor signal. Time is shown on the horizontal axis, and the values are shown on the vertical axis. It will be appreciated that the values illustrated may be represented by signal voltages (in an analog implementation) or numerical values (in a digital implementation) or similar techniques as will occur to one of skill in the art. The force sensor signal 150 is shown in FIG. 2 as having a large positive pulse, corresponding to a force being applied and then removed from the input pad of the force-based input device. This large positive pulse causes the maximum value 152 to be reset to the peak of the positive pulse, after which the maximum value decays with time. Note that, after a first time limit 153, the maximum value is reset 154 to the current value of the force sensor signal. The minimum value 156 is also shown, and tends to track the negative peaks of the force sensor signal.

FIG. 3, shown on the same time scale as FIG. 2, plots the resulting range value 158 obtained from the difference between the maximum value 152 (FIG. 2) and the minimum value 156 (FIG. 2). Updating the baseline estimate is disabled during the time interval 160 (FIG. 3) during which the range value exceeds the predetermined activity threshold 162.

Updating 110 the baseline estimate can include filtering the force sensor signal. For example, a recursive filter can be used, e.g.

$$B_{i,k} = (1-\alpha)B_{i,k-1} + \alpha S_{i,k}$$

where B is the baseline estimate, α is a constant, and $S_{i,k}$ is the force sensor signal for sensor i at sample k. Generally, it is desirable that 0<α<1, for example to provide stability of the filter. For example, a value of $\alpha = 0.5/f_s$ has proven useful in one embodiment, where $f_s$ is the sample rate. Note that, when the range exceeds the predetermined activity threshold (indicating touch activity), the updating is ceased, which can be described equivalently as $$B_{i,k} = B_{i,k-1}.$$

This can, for example, be implemented by setting α=1 during touch activity. Alternately, for example in a software implementation, the filtering may be halted during touch activity, and resumed when the touch event ends.

Various considerations enter into the selection of the predetermined activity threshold. If the threshold is set too low, there may be numerous false alarms, where touch activity is declared due to noise rather than an actual touch. On the other hand, if the threshold is set too high, there will be a long delay before touch activity is detected, and very light touches may be missed. Providing activity thresholds of about 6 to 20 times the expected variance of any noise present have proven useful in one exemplary embodiment.

When a relatively high activity threshold is used, detection of touch activity can be somewhat delayed. Hence, filtering the force sensor signal can be performed on delayed samples of the force sensor signal. Providing such delay can also help to prevent contamination of the baseline estimate by touch activity.

The method 100 can also include filtering the force sensor signals. For example, the force sensor signal may be low-pass filtered either before or after the baseline is estimated. Filtering the force sensor signal may be desirable to de-emphasize frequency components not related to touch-forces, for example high frequency noise. For example, a low pass filter with a 3 dB cutoff of 10 Hz has proven useful in one embodiment. Optionally, the filtering may include equalization, time shifting, or other processing to minimize differences between different force sensors. For example, if the force sensor signals are sequentially sampled, interpolation may be performed to produce new samples which are correctly time aligned. Accordingly, filter coefficients may consist of one common set for all channels or may consist of a different set for each channel in order to provide equalization and time shifting. Filtering may also include correcting for scale constants, non-linearity, and other factors as will occur to one skilled in the art.

Generally, by removing baseline errors from the sensors, improved performance in determining the characteristics of the applied touch force are obtained. Compensation of baseline errors can be performed before summing, converting, or otherwise using the force sensor signals in calculations. Alternately, corrections for gain, non-linearity, and the like may be performed before baseline compensation.

Figure 4:
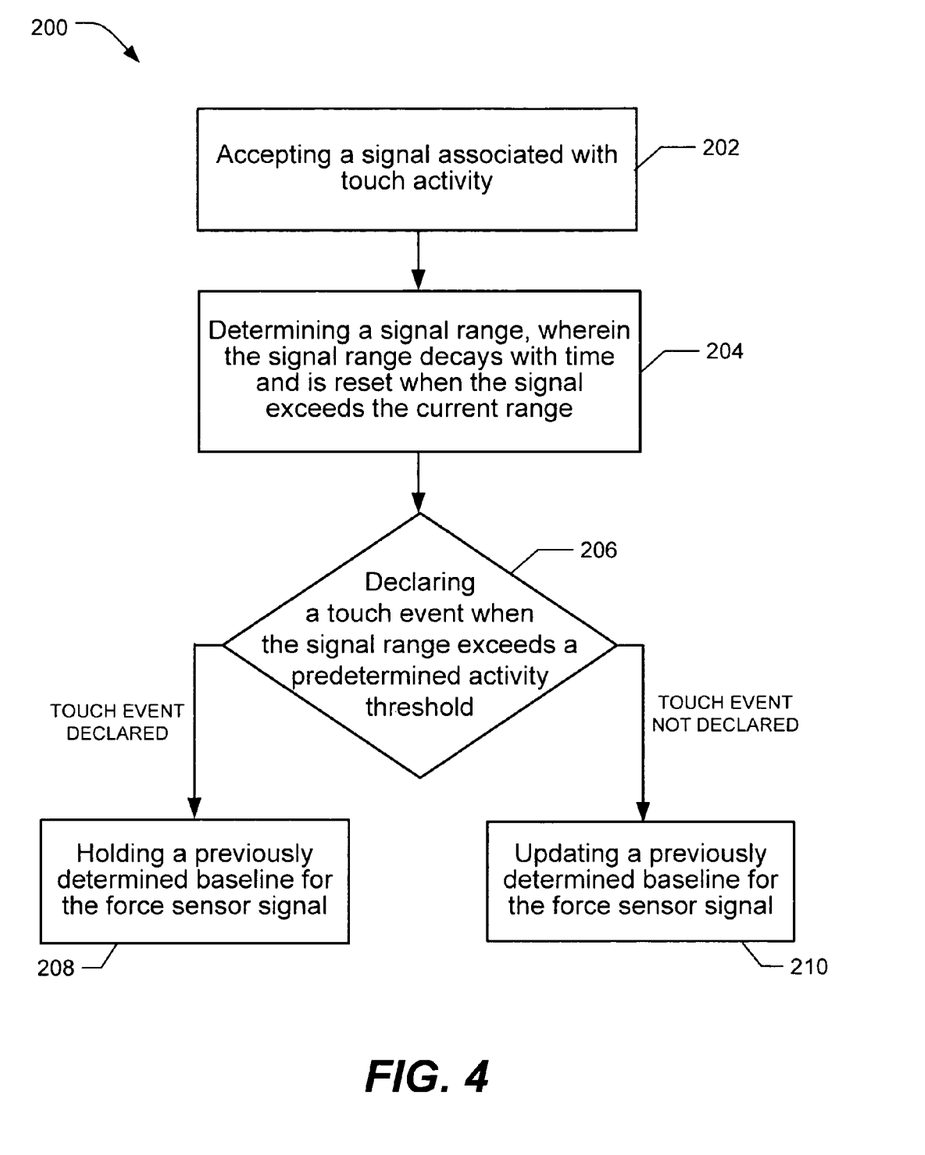
FIG. 4 illustrates a flow chart of a method for determining a force sensor signal baseline in accordance with an embodiment of the present invention.

In accordance with another embodiment of the present invention, FIG. 4 illustrates a flow chart of a method for determining a force sensor signal baseline. The method, shown generally at 200, can include accepting 202 a signal associated with touch activity. For example, the signal associated with touch activity may be the force sensor signal for which the baseline is to be determined. As another example, the signal associated with touch activity may be formed by summing some or all of the force sensor signals from force sensors in the touch-based input device. The method can also include determining 204 a signal range, wherein the signal range decays with time and is reset when the signal exceeds the current range. For example, the signal range can be determined by finding a minimum value, a maximum value, or both for the signal. The method can also include 206 declaring a touch event when the signal range exceeds a predetermined activity threshold. Various considerations in selecting the predetermined activity threshold are described above. The method can also include holding 208 a previously determined baseline for the force signal when a touch event is declared and updating 210 a previously determined baseline for the force sensor signal when a touch event is not declared. For example, updating a previously determined baseline can include filtering the force sensor signal. As discussed above, updating the previously determined baseline can be performed using a recursive filter.

In accordance with another embodiment of the present invention, the method 200 may include subtracting the previously determined baseline from the force sensor signal to produce a conditioned signal. Subtracting the previously determined baseline can be performed either before or after determining the signal range.

In accordance with another embodiment of the present invention, the method may include accepting a plurality of force sensor signals, determining a plurality of signal ranges, one for each of the force sensor signals, and declaring a touch event when any one or more of the signal ranges exceeds the predetermined activity threshold.

It should be noted that several options are available for declaring touch activity, and disabling the updating of force sensor baselines. In one option, each force sensor baseline update is disabled based on its own touch activity. In other words, baseline update of each force sensor is performed independently. In another option, all force sensor baselines are disabled when any force sensor indicates touch activity. In another option, all force sensor baselines are disabled when the total force signal indicates touch activity. Baseline updating may also be disabled when a force sensor signal is determined to be in saturation or a non-linear mode of operation.

Which of these options is preferable depends upon the noise characteristics of the force sensors. For example, noise may be correlated or uncorrelated between channels. If noise is uncorrelated, for example, electrical circuit noise, use of the total force signal is usually preferable, since it provides a constant output regardless of touch location. If noise is correlated, for example, due to vibration or electric interference, use of individual sensor signals is usually preferable. When individual sensors are observed, however, a sensor located far from where the touch force is applied may have a very small output. Hence, better performance may be obtained by disabling all updates when any sensor individually indicates touch activity.

Figure 5:
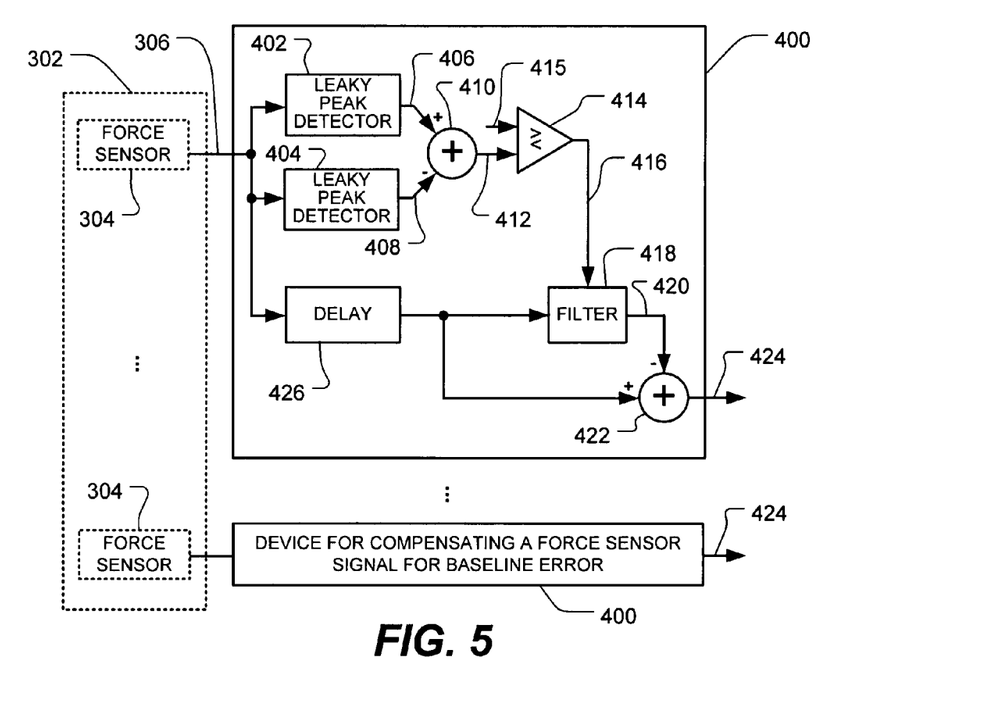
FIG. 5 illustrates a block diagram of a device for compensating a force sensor signal for baseline error in accordance with an embodiment of the present invention.

In accordance with another embodiment of the invention, FIG. 5 illustrates a device for compensating a force sensor signal for baseline error. The device, shown generally at 400, can be used to provide signal conditioning of one or more force sensor signals 306 output by force sensors 304 in a force-based input device 302. The device includes a first leaky peak detector 402 and a second leaky peak detector, 404, both of which are configured to accept the force sensor signal, and determine, respectively, a maximum decaying value 406 and a minimum decaying value 408. The device also includes a first subtractor 410 configured to subtract the minimum value from the maximum value and output a range value 412. The range value thus provides a measure of the range of force sensor signal variation. The device can also include a comparator 414 coupled to the subtractor and configured to output an update enable signal 416 when the range value is less than a predetermined activity threshold 415. The predetermined activity threshold thus corresponds to the point at which touch activity is assumed to be present. The device can include a filter 418, configured to accept the force sensor signal and produce a baseline estimate 420 when the update enable signal is asserted, and configured to hold a previously determined baseline estimate when the enable signal is not asserted. Finally, the device can include a second subtractor 422 coupled to the filter and configured to subtract the baseline estimate from the force sensor signal and output a conditioned signal 424.

An optional delay 426 can be included at the input to the filter 418. The delay, when present, helps to prevent contamination of the baseline estimate 420 by touch activity, as described above.

In accordance with another embodiment of the invention, multiple devices 400 may be used to condition a plurality of force sensor signals 306. In yet another embodiment, the device may be integrated with the force-based input device 302.

In accordance with one embodiment of the present invention, the leaky peak detector may be implemented using a single-pole recursive low-pass filter. For example, the peak may be determined as $$P_{i,k} = (1-\delta)P_{i,k-1} + \beta S_{i,k}$$

where P is the maximum (or minimum), following the notation used above, and $\delta$ is the reciprocal of the effective number of samples $\delta = 1/N$ included in the estimate. For example, values of N=20 seconds*$f_s$ have proven useful in one exemplary implementation.

Figure 6:
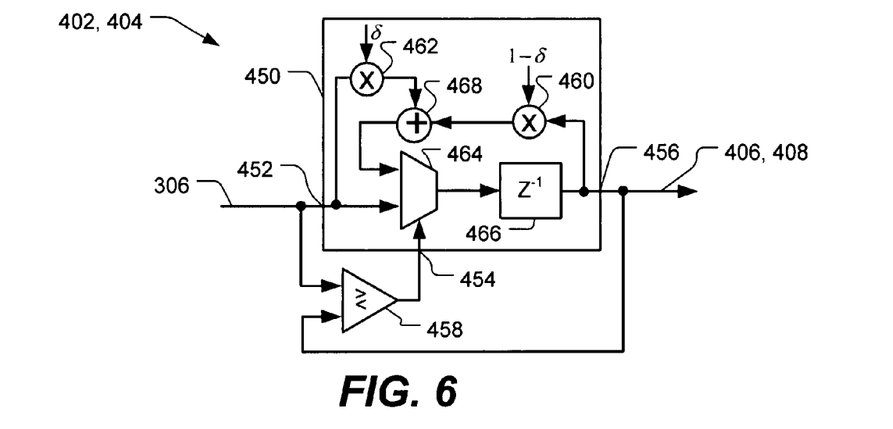
FIG. 6 illustrates a circuit diagram of a leaky peak detector in accordance with an embodiment of the present invention.

Leaky peak detectors can be implemented in hardware or software. For example, pseudo code has been illustrated above for determining a decaying maximum value which can readily be implemented by one skilled in the art to implement a leaky peak detector. FIG. 6 illustrates a detailed implementation of a leaky peak detector 402, 404 in accordance with another embodiment of the present invention. The leaky peak detector may be implemented using an exponentially decaying memory 450 having a load input 452 and a load enable 454. The exponentially decaying memory is configured to hold and output an exponentially decaying extremum value 456. The load enable causes the exponentially decaying memory to load the value of the force sensor signal 306 when asserted. For example, the exponentially decaying memory may be implemented using multipliers 460, 462, decay coefficient $\delta$, multiplexer 464, register 466, and adder 468 as illustrated. Implementation of the exponentially decaying memory in software will be readily apparent to one skilled in the art.

The leaky peak detector can also include a comparator 458. The comparator compares the extremum value 456 with the force sensor signal 306, and asserts the load enable 454 when the force sensor signal exceeds the extremum value. The extremum value may be positive or negative, and the direction of exceeding can be either positive or negative. For example, to implement a maximum detector, the comparator asserts the load enable when the force sensor signal is greater than the extremum value. To implement a minimum detector, the comparator asserts the load enable when the force sensor signal is less than the extremum value. Implementation of the comparator in software will also be readily apparent to one skilled in the art.

In one particular embodiment, the force-based input device may include piezoelectric or other dynamic force sensors. Dynamic sensors can provide an additional challenge to determining the baseline because dynamic sensors tend to only provide a deviation from baseline during changing force conditions. Hence, a dynamic baseline can be obtained to take into account and partially compensate for the characteristics of the piezoelectric or other dynamic sensor. Thus, the method may include compensating for dynamic baseline of the sensor. For example, the dynamic response of a piezoelectric transducer is dominated by a single-pole high-pass filter characteristic. The state space response function can be described by $$v(s) = K\varepsilon(s)\frac{s}{s+\omega_0}$$

where v(s) is the output response to strain input ε(s), K is the strain to voltage factor, and $\omega_0 = 1/\tau_0$. The response thus has a zero at the origin and a real pole at frequency $\omega_0$. The location of the pole depends on the circuitry to which the piezoelectric sensor is coupled.

Figure 7:
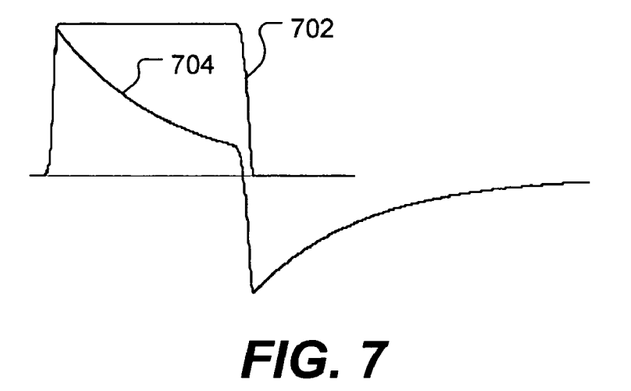
FIG. 7 illustrates a time plot of simulated output from a dynamic force sensor in accordance with an embodiment of the present invention.

FIG. 7 illustrates a time plot of simulated output from a dynamic force sensor, in accordance with an embodiment of the present invention. An applied step force, for example a touch force, is shown by curve 702, and the force sensor output by curve 704. When the step force is applied the output from the piezoelectric sensor rises abruptly, and then drops exponentially with time constant $\tau_0$. When the force is removed, there is a negative step, dropping abruptly and then rising exponentially.

Compensation for the exponential drop may be provided by forming a dynamic baseline from $$B_{i,k} = (1-\alpha)B_{i,k-1} + \beta S_{i,k}$$

where the constants are chosen as $$\alpha = 1/n_2$$
$$\beta = \frac{n_1 - n_2}{n_1 n_2}$$
$$n_1 = f_s/\omega_1 = \tau_1 f_s$$
$$n_2 = f_s/\omega_2 = \tau_2 f_s$$

where $n_1, n_2$ are time constants expressed in numbers of samples. If $\tau_1$ is chosen to be very close to the time constant of the transducer ($\tau_0$) then $\tau_2$ will be the dominant time constant of the system.

Figure 8:
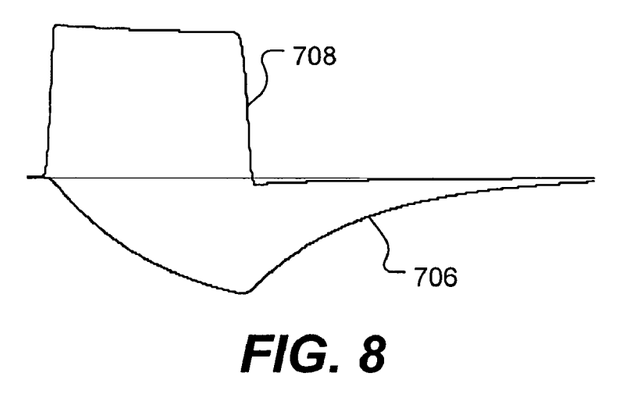
FIGS. 8 and 9 illustrate time plots of the dynamic baseline and resulting compensated force sensor output in accordance with an embodiment of the present invention.

The force sensor output can be compensated for dynamic baseline, for example, by subtracting the dynamic baseline from the force sensor output to obtain a compensated force sensor output. For example, FIG. 8 illustrates a time plot of the dynamic baseline 706, and resulting compensated force sensor output 708 for the example of FIG. 7, where $\tau_2 \gg \tau_0$.

Figure 9:
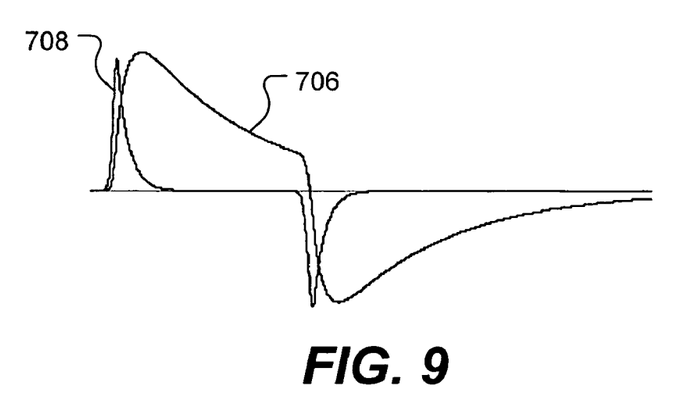

Various values of $\tau_2$ can provide advantageous depending on the application. For example, for continuous touch location determination (streaming mode) a large value of $\tau_2$ may be chosen. For example, a value of $\tau_2 = 100$ seconds has proven useful in one embodiment. Alternately, for single touch location determination, $\tau_2$ may be chosen to approximate the length of a typical touch. For example, a value of $\tau_2 = 0.5$ second has proven useful in one embodiment. Baseline error will be amplified, however by a factor of $\tau_2/\tau_1$ which may set a limit to how large a value of $\tau_2$ is used. FIG. 9 illustrates a time plot of the dynamic baseline 706 and resulting compensated force sensor output 708 for the example of FIG. 7, where $\tau_2 \ll \tau_0$.

Preferably, $\tau_1$ is chosen to be slightly less than $\tau_0$, for example 95% of $\tau_0$ since this can help to avoid instability due to overcompensation. If the amplification factor $\tau_2/\tau_1$ is small (e.g., much less than 1) correction for baseline error may be omitted. Conversely, if the amplification factor is large, it is preferable to correct for baseline error, as discussed above, before compensating for the dynamic baseline.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and are not to be limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where, for a specific claim limitation, all of the following conditions are present: a) "means for" or "step for" is expressly recited in the claim limitation; b) a corresponding function is expressly recited in the claim limitation; and c) structure, material or acts that support that structure are expressly recited within the specification. Accordingly, the scope of the invention should be determined solely by the appended claims and their legal equivalents, rather than by the descriptions and examples given above.

What is claimed is:

1. A method of compensating a force sensor signal for baseline error, the force sensor signal being output by a force sensor in a force-based input device, the force sensor signal being used to determine a touch location on the force-based input device, the method comprising:

subtracting a baseline estimate from the force sensor signal to obtain a corrected force sensor signal;

determining a decaying maximum value of the corrected force sensor signal, wherein the decaying maximum value is reset to a current value of the corrected force sensor signal when the current value of the corrected force sensor signal is greater than the decaying maximum value;

determining a decaying minimum value of the corrected force sensor signal, wherein the decaying minimum value is reset to a current value of the corrected force sensor signal when the corrected force sensor signal is less than the decaying minimum value;

subtracting the decaying minimum value from the decaying maximum value to form a range value;

updating the baseline estimate by holding the baseline estimate when the range is greater than a predefined activity threshold and updating the baseline estimate based on the force sensor signal when the range value is less than the first predefined activity threshold; and outputting the corrected force sensor signal.

2. The method of claim 1, wherein the decaying maximum value decays exponentially towards a mean value of the corrected force sensor signal and the decaying minimum value decays exponentially towards a mean value of the corrected force sensor signal.

3. The method of claim 1, wherein:

determining a decaying maximum value further comprises:
  determining a first time interval since a last reset of the maximum value, and
  setting the maximum value to a current value of the force sensor signal when the first time interval is greater than a first time limit; and determining a decaying minimum value further comprises:
  determining a second time interval since a last reset of the minimum value, and
  setting the minimum value of a current value of the force sensor signal when the second time interval is greater than a second time limit.

4. The method of claim 1, wherein updating the baseline estimate further comprises holding the baseline estimate during periods of time when one or more of the force sensors are in saturation.

5. The method of claim 1, wherein updating the baseline estimate based on the force sensor signal comprises filtering the force sensor signal.

6. The method of claim 5, wherein filtering the force sensor signal comprises recursive filtering of the force sensor signal.

7. The method of claim 1, further comprising filtering the force sensor signal.

8. The method of claim 1, further comprising compensating for dynamic baseline of the force sensor signal wherein the force sensor is of a piezoelectric type.

9. A device for baseline compensating a force sensor signal output by a force sensor in a force-based input device, the force sensor signal providing measurements of force transmitted to the force sensor by a touch force applied to the force-based input device, the device comprising:

a first leaky peak detector configured to accept the force sensor signal and output a decaying maximum value;

a second leaky peak detector configured to accept the force sensor signal and output a decaying minimum value;

a first subtractor operatively coupled to the first leaky peak detector and the second leaky peak detector and configured to subtract the minimum value from the maximum value and output a range value;

a comparator operatively coupled to the subtractor and configured to output an update enable signal when the range value is less than a predetermined activity threshold;

a filter operatively coupled to the comparator and configured to accept the force sensor signal and produce a baseline estimate when the update enable signal is asserted, and configured to hold a previously determined baseline estimate when the enable signal is not asserted; and a second subtractor operatively coupled to the filter and configured to accept the force sensor signal and subtract the baseline estimate from the force sensor signal and output a conditioned signal.

10. The device of claim 9, wherein each of the first and second leaky peak detector comprise:

an exponentially decaying memory configured to hold and output an extremum value and having a load input configured to accept the force sensor signal and a load enable;

a comparator operatively coupled to the exponentially decaying memory and configured to compare the force sensor signal to the extremum value and assert the first exponentially decaying memory load enable when the force sensor signal exceeds the extremum value.

11. The device of claim 9, further comprising the force-based input device coupled to the device for baseline compensating a force sensor signal output.

* * * * *

UNITED STATES PATENT AND TRADEMARK OFFICE
CERTIFICATE OF CORRECTION

PATENT NO. : 7,337,085 B2
APPLICATION NO. : 11/402692
DATED : February 26, 2008
INVENTOR(S) : David A. Soss It is certified that error appears in the above-identified patent and that said Letters Patent is hereby corrected as shown below:

Title page, item [57]
ABSTRACT: cancel the text beginning with "Disclosed is method and device for..." and ending with "...the force sensor signal." and replace with the following:

"Disclosed is method and device for compensating a force sensor signal for baseline error in a force-based touch screen. In one embodiment, baseline compensation includes determining a decaying maximum value and a decaying minimum value of the force sensor signal, and subtracting these values to obtain a range value. When the range value is less than a predetermined activity threshold, updating of the baseline is enabled. The decaying maximum value and decaying minimum value are reset to the current value of the force sensor signal when exceeded by the current value of the force sensor signal."

Signed and Sealed this

Ninth Day of December, 2008

JON W. DUDAS
*Director of the United States Patent and Trademark Office*